(12) United States Patent
Uhl et al.

(10) Patent No.: US 6,237,807 B1
(45) Date of Patent: May 29, 2001

(54) COMPACT LIQUID DOSING APPARATUS WITH A RESERVOIR

(75) Inventors: Stephan Uhl, Haan; Frank-Rainer Schuster, Erkrath; Dieter Buhrau, Dormagen; Juergen Kreyer, Hilden; Heribert Lohwieser, Siegsdorf, all of (DE)

(73) Assignee: Henkel-Ecolab GmbH & Co.OHG, Duesseldorf (DE)

( * ) Notice: Subject to any disclaimer, the term of this patent is extended or adjusted under 35 U.S.C. 154(b) by 0 days.

(21) Appl. No.: 09/446,687
(22) PCT Filed: Jun. 15, 1998
(86) PCT No.: PCT/EP98/03593
§ 371 Date: Mar. 27, 2000
§ 102(e) Date: Mar. 27, 2000
(87) PCT Pub. No.: WO98/59222
PCT Pub. Date: Dec. 30, 1998

(30) Foreign Application Priority Data

Jun. 24, 1997  (DE) .............................................. 197 26 707

(51) Int. Cl.⁷ ................. B67D 5/08; B67D 5/58
(52) U.S. Cl. ................. 222/39; 222/87; 222/66; 222/67; 222/318; 222/189.11
(58) Field of Search .................. 222/82, 87, 39, 222/51, 64, 66, 67, 318, 189.06, 189.11

(56) References Cited

U.S. PATENT DOCUMENTS

| | | | |
|---|---|---|---|
| 3,367,353 | * 2/1968 | Hunter | 137/101.31 |
| 3,531,021 | 9/1970 | Bassett | 222/81 |
| 4,489,857 | * 12/1984 | Batlas | 222/179 |
| 4,998,850 | 3/1991 | Crowell | 406/48 |

FOREIGN PATENT DOCUMENTS

| | | |
|---|---|---|
| 36 14 621 | 11/1987 | (DE) . |
| 2 277 177 | 1/1976 | (FR) . |
| WO95/23549 | 9/1995 | (WO) . |

* cited by examiner

*Primary Examiner*—Kevin Shaver
*Assistant Examiner*—Patrick Buechner
(74) *Attorney, Agent, or Firm*—Wayne C. Jaeschke; Glenn E. J. Murphy; Kenneth Watov

(57) ABSTRACT

The invention relates to a dosing apparatus with a container having a charging hole for a refill bag with a liquid in the top part, and an outlet in the bottom part. An opening device for the refill bag is fitted above the outlet. A connector leads from the outlet to a downstream pump. A chamber with a level sensor is arranged underneath the reservoir. The reservoir and the chamber are configured so as to be liquid tight, for supplying the liquid without a refill bag. A dosing pump is integrated within the dosing apparatus. A dosing conduit leads from the pump to a point of usage outside the dosing apparatus, and a return conduit leads to the integrated container.

20 Claims, 2 Drawing Sheets

COMPACT LIQUID DOSING APPARATUS WITH A RESERVOIR

BACKGROUND

1.0 Field of the Invention

The invention relates generally to a metering unit for chemical cleaning agents and cleaning aids, for insuring that such agents and aids are dispensed in a manner to maintain predetermined concentrations for use handling of substances.

2.0 Discussion of Related Art

In the field of hygiene, various substances are used for cleaning and conditioning the cleaning agents and aids. The substances used are often chemical products which are almost always prepared and stored in higher concentrations than are necessary or appropriate for use. Accordingly, they have to be suitably diluted before or during use. In order to be able to maintain the required concentration of the substances in the solution during dilution, the substances have to be delivered in the right amount.

In the institutional sector in particular, difficulties are involved in manually adding the substances in that, this is a labor-intensive task and, the substances used are often substances which can on contact with human skin cause irritation or injury. Because of this, efforts are generally made to mechanize and automate the handling of such substances.

If the substances are present in solid or powder form, a dissolving liquid, for example water, is normally introduced into the storage container so that a certain amount of substance is dissolved and can be put to use. The disadvantage of this procedure is that the concentration of the substances in the solution is very difficult to control. Another disadvantage of dispensers of this type is that the quantity of substance dispensed varies with varying water pressure and, where the water pressure is high, is very difficult to determine.

If the substances are present in liquid form, their concentration is generally well-defined. Accordingly, liquids can be metered by volume to ensure an exact concentration of the liquid in the solution. Metering systems of this type are often very complex arrangements which are difficult to handle. The various units required for carrying out the corresponding process steps have to be clearly arranged in appropriate association and operated accordingly. This calls for considerable alertness and experience on the part of the operator. Accordingly, various attempts have been made to integrate such systems in a neat and compact form and, at the same time, to guarantee a high degree of automation.

WO 95/23549 describes systems in which inter alia the liquid substances are stored and can be automatically delivered to a following pump. The disadvantage of this system is that a refill bag holding the liquid substance remains in the unit until it is empty and the pump is externally arranged. In addition, a very complicated volume control system is required for the pump because excess substance is very difficult to return where metering is based on volume.

3.0 Summary of the Invention

An object of the present invention is to provide a metering unit that includes refill packs that can be removed immediately from a container of the metering unit after filling it with liquid. Another object is to provide the metering unit with means for monitoring the level of the liquid concentrate supply in a holding container thereof. Yet another object of the invention is to provide compact packaging for the metering unit.

In one embodiment of the present invention, with the problems of the prior art in mind, the metering unit includes a chamber with a level sensor arranged below a storage container, the container and the chamber being made liquid-tight to hold the liquid without requiring the presence of a refill bag, and a metering pump being integrated in the metering unit. A metering line leads to a user outside the metering unit, and a return line leads back to the integrated container, whereby one end of each line is connected to the pump.

The present metering unit has the advantage that, because the refill bag does not remain in the unit after it is refilled, the unit can be more effectively emptied. In addition, possible sources of contamination are eliminated by the removal of the bag after filling because the automatic opening of the bag can lead to uncontrolled damage and leakages of liquid. Another major advantage is that a metering pump is integrated into the unit. On the one hand, this enables the returned quantities of liquid to be directly brought back into the storage container by a short route and hence to be re-used. On the other hand, this compact arrangement and, above all, the provision of the level sensor provide for clear and well-organized control and automation.

Since it is impossible to prevent impurities from entering the system, for example through incompetent destruction of the refill bag or through soiling thereof, an embodiment in which a fine-mesh sieve is provided between the container and the pump is particularly advantageous. The positioning of this fine-mesh sieve in the outlet opening of the container is preferred.

The level sensor is designed in such a way that it can differentiate between different filling levels, this can be used very effectively to indicate readiness for use when the filling level is normal, and to generate a refill signal when a predetermined lower filling level is reached. In one particularly advantageous embodiment, the metering unit is automatically switched off when a minimum filling level is reached to avoid errors and possible damage to or destruction of the metering pump this way. In a preferred embodiment, the level sensor is a float switch.

In another particularly advantageous embodiment provided by integration of the metering unit, a piston diaphragm pump is used as the metering pump. This provides for the stepless control of metering integrated in a simple and favorable manner.

BRIEF DESCRIPTION OF THE DRAWINGS

The above-mentioned advantages and other advantages are illustrated by the following description of one example of an embodiment of the invention in which like items are identified by the same reference designation, shown in the accompanying drawings, in which like items are identified by the same reference designation, wherein.

DETAILED DESCRIPTION OF THE INVENTION

Figure 1:
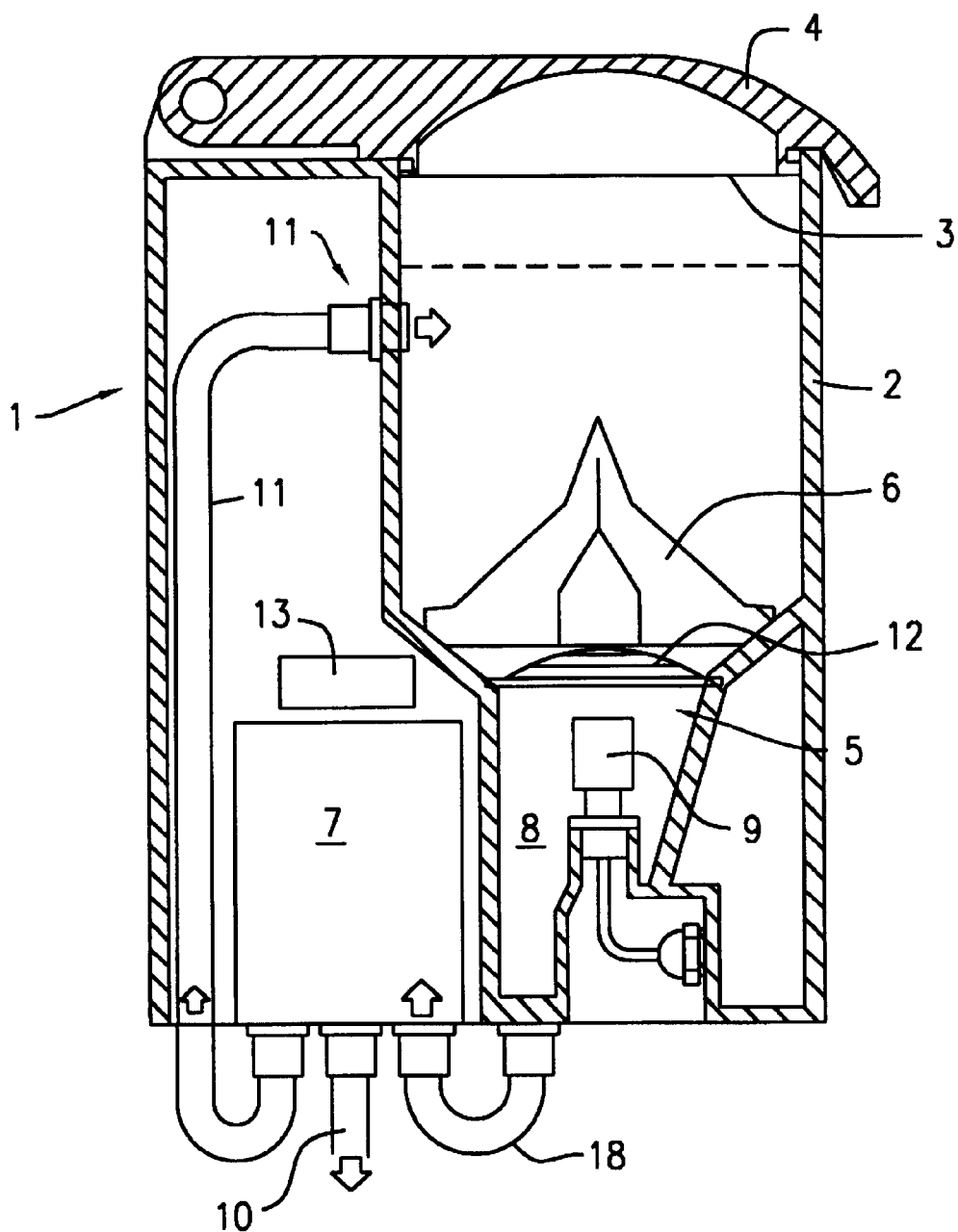
FIG. 1 is a sectional side elevational view, of the metering unit of the invention.

FIG. 1 shows the container 2 having a filling opening 3—located in the upper part—that is designed to be closed by a cover 4. Located in the conically tapering base is the outlet opening 5 in which a fine-mesh sieve 12 is disposed, and above which is provided a refill bag formed by crossed blades.

Arranged beneath the outlet opening 5 is a chamber 8 in the lower opening of which a connecting line 18 carrying the product to be metered to the integrated metering pump 7 is present. The metering pump 7 may be formed, for example, by a piston diaphragm pump from which a product line 10 leads to the user situated outside the unit. In the illustrated embodiment, the user could be, for example, an institutional dishwashing machine to which a rinse aid is thus fed in the necessary quantities as and when required. In addition, a return line 11 leads from the metering pump 7 to a return opening in the side wall of the container 2.

Figure 2:
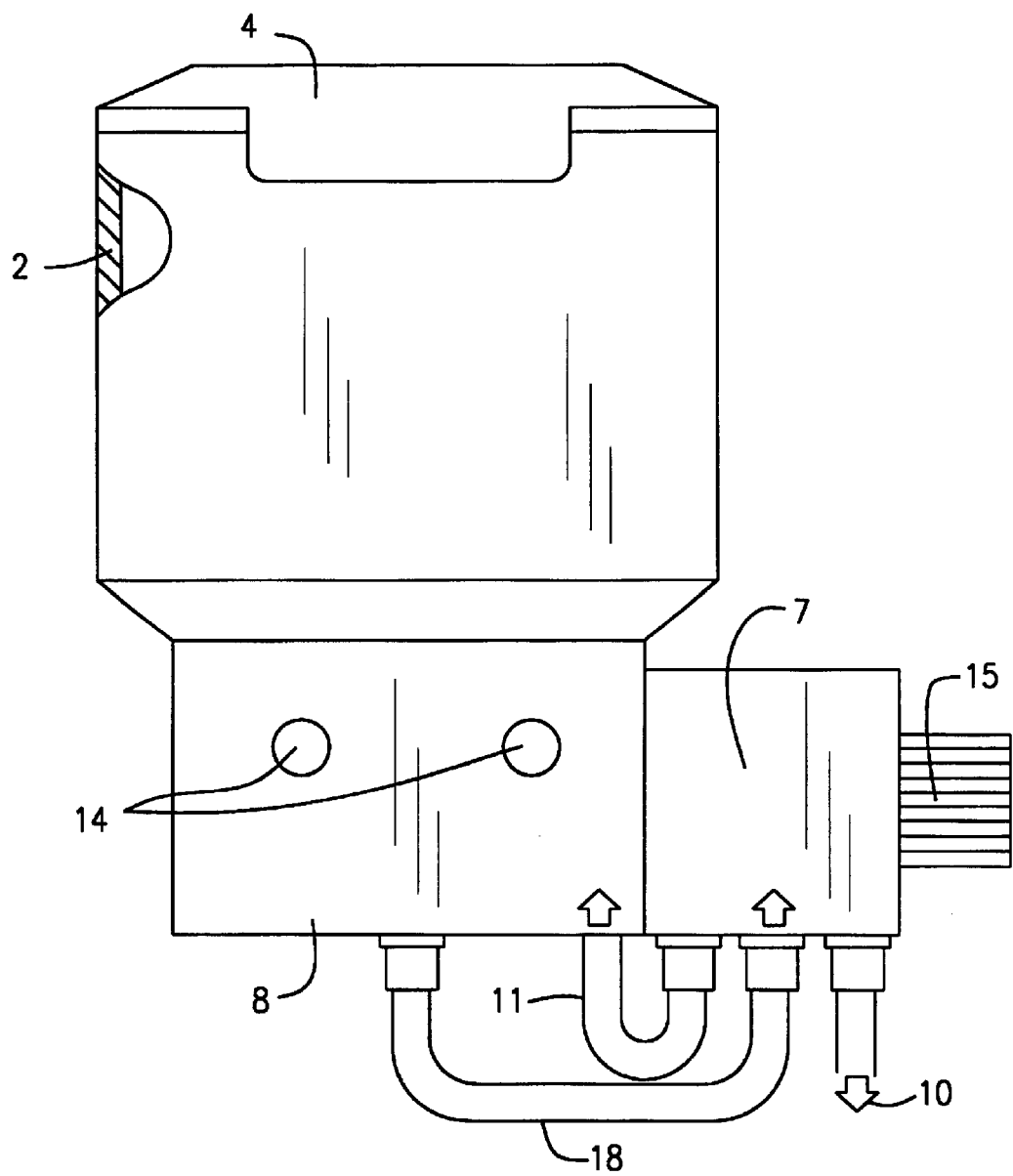
FIG. 2 is a side elevational view of the metering unit turned through 90°.

Arranged in the chamber 8 is a level sensor 9 provided by a float switch. The float switch enables a ready signal to be generated when the filling level is normal and a refill signal to be generated when the filling level is low. These signals may be formed by acoustic signal generators 13 or optical signal generators 14 (see FIG. 2). The metered volume can be steplessly controlled by a control knob 15 on the metering pump 7, as shown in FIG. 2.

If the metering unit 1 needs to be refilled, the cover 4 is removed and a refill bag is introduced through the opening 3 and slit open by the crossed blades 6. The weight of the refill bag itself is sufficient for the bag to be slit open when it comes into contact with the opener 6. The illustrated arrangement of crossed blades 6 opens the bag at its base in such a way that complete opening of the refill bag is guaranteed. The bag is withdrawn in such a way that the every last drop of the refill liquid can be removed, optionally after a holding phase.

The interior of the container 2 communicates directly with the chamber 8 arranged beneath the container 2 so that the liquid poured in reaches the bottom of the chamber 8. If impurities are introduced into the unit 1 with the refill bag (not shown) or if parts of the refill bag become detached during opening, the fine-mesh sieve 12 disposed in the outlet opening 5 in the illustrated embodiment prevents those impurities/fragments from entering the chamber 8 where they could cause blockages in passages and lines or could interfere with the float switch 9. In particular, the fine-mesh sieve 12 prevents impurities or foreign bodies from functionally impairing the pump.

If, as in the illustrated embodiment, the metering pump 7 is formed by a piston diaphragm pump, the metered volume can be steplessly controlled very easily. The volume of liquid delivered per diaphragm stroke which exceeds the set volume is guided to the return line 11 through a second outlet opening. The return line 11 is connected to an opening in the side wall of the container through which the volume returned is directly brought back into the storage container 2.

Space for accommodating the electrical and electronic controls is available in the lower part of the metering unit 1 on the side opposite the pump space. In this way, the mechanisms and devices for carrying out the various functions of the integrated metering unit can be accommodated in a very small space in a compact, but neat and readily accessible manner.

Although an illustrated embodiment of the invention has been shown and described, it is not meant to be limiting. Those of skill in the art may recognize various modifications to this embodiment, which modifications are meant to be covered by the spirit and scope of the appended claims.

What is claimed is:

1. A metering unit comprising a storage container which, in an upper part, has an opening for the introduction of refill bags holding a liquid and, in a base portion, comprises an outlet opening above which a device for opening the refill bag is disposed, said unit further including a pump, and a chamber located below the outlet, wherein the container and the chamber are made liquid-tight to hold the liquid without a refill bag, the chamber further including a level sensor adapted for sensing filling levels, respectively, of the liquid held therein, and the pump is a metering pump integrated in a metering unit of which the inlet is connected to the chamber, and from which a metering line leads to a user outside the metering unit, and a return line leads back to the storage container.

2. A metering unit as claimed in claim 1, wherein the metering unit is automatically switched off when the filling level is minimal.

3. A metering unit as claimed in claim 1, wherein the level sensor is a float switch.

4. A metering unit as claimed in claim 1, wherein the metering pump is a piston diaphragm pump.

5. A metering unit as claimed in claim 4, wherein the piston diaphragm pump includes a control knob for the stepless control of metering.

6. A metering unit as claimed in claim 1, further including a fine-mesh sieve arranged between the container and the pump.

7. A metering unit as claimed in claim 6, wherein the metering unit is automatically switched off when the filling level is minimal.

8. A metering unit as claimed in claim 6, wherein the level sensor is a float switch.

9. A metering unit as claimed in claim 6, wherein the metering pump is a piston diaphragm pump.

10. A metering unit as claimed in claim 6, wherein the fine-mesh sieve is disposed in said outlet opening.

11. A metering unit as claimed in claim 10, wherein ready and refill signals are generated at normal and low filling levels, respectively.

12. A metering unit as claimed in claim 10, wherein the metering unit is automatically switched off when the filling level is minimal.

13. A metering unit as claimed in claim 10, wherein the level sensor is a float switch.

14. A metering unit as claimed in claim 10, wherein the metering pump is a piston diaphragm pump.

15. A metering unit as claimed in claim 6, wherein ready and refill signals are generated at normal and low filling levels, respectively.

16. A metering unit as claimed in claim 15, wherein the metering unit is automatically switched off when the filling level is minimal.

17. A metering unit as claimed in claim 15, wherein the level sensor is a float switch.

18. A metering unit as claimed in claim 15, wherein the metering pump is a piston diaphragm pump.

19. A metering unit as claimed in claim 15, wherein the signals are generated by optical signal generators and/or acoustic signal generators.

20. A metering unit as claimed in claim 19, wherein the metering unit is automatically switched off when the filling level is minimal.

* * * * *